(12) United States Patent
Kim et al.

(10) Patent No.: US 11,346,502 B2
(45) Date of Patent: May 31, 2022

(54) MOBILE LIQUID AND GASEOUS HYDROGEN REFUELING APPARATUS

(71) Applicant: Hylium Industries, Inc., Seongnam-si (KR)

(72) Inventors: Seo Young Kim, Yongin-si (KR); Hong Yeol Yun, Hwaseong-si (KR); Jung Ki Min, Seoul (KR)

(73) Assignee: Hylium Industries, Inc., Seongnam-si (KR)

( * ) Notice: Subject to any disclaimer, the term of this patent is extended or adjusted under 35 U.S.C. 154(b) by 0 days.

(21) Appl. No.: 16/879,509

(22) Filed: May 20, 2020

(65) Prior Publication Data
US 2021/0010641 A1    Jan. 14, 2021

(30) Foreign Application Priority Data

May 20, 2019  (KR) ......................... 10-2019-0058695

(51) Int. Cl.
*F17C 7/00*       (2006.01)
*F17C 5/06*       (2006.01)
*F17C 5/00*       (2006.01)

(52) U.S. Cl.
CPC .............. *F17C 5/007* (2013.01); *F17C 5/06* (2013.01); *F17C 7/00* (2013.01);
(Continued)

(58) Field of Classification Search
CPC .... F17C 5/007; F17C 5/06; F17C 7/00; F17C 2250/01; F17C 2265/065;
(Continued)

(56) References Cited

U.S. PATENT DOCUMENTS

| 4,276,749 A | * | 7/1981 | Crowley | .................. F17C 9/02 |
| | | | | 62/48.2 |
| 5,228,295 A | * | 7/1993 | Gustafson | ............... F02B 43/00 |
| | | | | 62/7 |

(Continued)

FOREIGN PATENT DOCUMENTS

| EP | 1360084 B1 | * | 8/2006 | ................ B60S 5/02 |
| KR | 10-2017-0066587 | | 6/2017 | |
| KR | 10-2019-0031386 | | 3/2019 | |

OTHER PUBLICATIONS

EP-1360084-B1_English_Translation_of_Specification (Year: 2021).*
Johnson, Lee, "What Happens to the Volume of a Gas During Compression", Mar. 9, 2018. [Retrieved on Jun. 11, 2021. Retrieved from Internet URL: https://sciencing.com/what-happens-to-the-volume-of-a-gas-during-compression-13710237.html] (Year: 2018).*

*Primary Examiner* — Timothy P. Kelly
*Assistant Examiner* — Stephanie A Shrieves
(74) *Attorney, Agent, or Firm* — H.C. Park & Associates, PLC

(57) ABSTRACT

A mobile liquid and gaseous hydrogen refueling apparatus including: a main storage module for receiving liquid hydrogen to produce first gaseous hydrogen; a liquid pumping and transporting module for receiving the liquid hydrogen, pumping the liquid hydrogen, and producing second gaseous hydrogen; a gas compressing and storing module for receiving at least one of the first gaseous hydrogen and the second gaseous hydrogen and compressing and storing the at least one gaseous hydrogen; and a gas converting and transporting module for receiving the pumped liquid hydrogen and the compressed gaseous hydrogen, performing heat exchange between the pumped liquid hydrogen and the compressed gaseous hydrogen, producing gaseous hydrogen for refueling, and transporting the gaseous hydrogen for refueling to a gaseous hydrogen fuel consumption structure.

19 Claims, 8 Drawing Sheets

(52) U.S. Cl.
CPC .......................... *F17C 2205/0355* (2013.01); *F17C 2221/012* (2013.01); *F17C 2223/0153* (2013.01); *F17C 2225/0123* (2013.01); *F17C 2225/036* (2013.01); *F17C 2227/0135* (2013.01); *F17C 2227/0157* (2013.01); *F17C 2227/0306* (2013.01); *F17C 2250/01* (2013.01); *F17C 2265/065* (2013.01); *F17C 2270/0139* (2013.01); *F17C 2270/0168* (2013.01); *F17C 2270/0184* (2013.01)

(58) Field of Classification Search
CPC ...... F17C 2270/0139; F17C 2270/0168; F17C 2223/0153; F17C 2221/012; F17C 2227/0135; F17C 2225/0123; F17C 2227/0306; F17C 2205/0355; F17C 2225/036; F17C 2270/0184; F17C 2227/0157; F17C 5/02; F17C 2223/0161; F17C 2223/0123; F17C 2223/033; F17C 2223/036; F17C 2270/0171; F17C 2270/0189; F17C 13/00; F17C 2203/0391; F17C 2205/0352; F17C 2225/0153; F17C 2227/03; F17C 2227/0344; F17C 2227/039; F17C 2227/042; F17C 2265/06; F17C 2227/0185; F17C 7/04; F17C 2227/041; F17C 2227/0313; Y02P 90/45; Y02E 60/32

USPC ....................................... 137/234.6
See application file for complete search history.

(56) References Cited

U.S. PATENT DOCUMENTS

| | | | | |
|---|---|---|---|---|
| 5,315,831 | A * | 5/1994 | Goode | F02B 43/00 62/611 |
| 5,325,894 | A | 7/1994 | Kooy et al. | |
| 5,771,946 | A * | 6/1998 | Kooy | F17C 6/00 141/82 |
| 6,755,225 | B1 * | 6/2004 | Niedwiecki | B60P 3/14 141/231 |
| 7,284,575 | B2 * | 10/2007 | Gram | F04B 5/02 141/100 |
| 10,317,011 | B2 | 6/2019 | Okuno et al. | |
| 2004/0250871 | A1 * | 12/2004 | Bingham | F17C 7/02 141/59 |
| 2006/0156742 | A1 * | 7/2006 | Farese | F17C 9/00 62/50.2 |
| 2008/0216913 | A1 * | 9/2008 | Kederer | F17C 5/007 141/2 |
| 2014/0110017 | A1 * | 4/2014 | Gupta | F17C 5/007 141/4 |
| 2014/0196814 | A1 * | 7/2014 | Nagura | F17C 13/026 141/82 |
| 2015/0362128 | A1 * | 12/2015 | Sanglan | F17C 9/00 62/50.2 |
| 2018/0208275 | A1 * | 7/2018 | Unno | F17C 5/04 |

* cited by examiner

MOBILE LIQUID AND GASEOUS HYDROGEN REFUELING APPARATUS

CROSS REFERENCE TO RELATED APPLICATION

This application claims priority from and the benefit of Korean Patent Application No. 10-2019-0058695, filed on May 20, 2019, which is hereby incorporated by reference for all purposes as if fully set forth herein.

BACKGROUND

Field

Exemplary embodiments of the present invention relate to a mobile liquid and gaseous hydrogen refueling apparatus.

Discussion of the Background

As is well-known, generally, hydrogen is the lightest element among the elements existing on the Earth and the most abundant chemical substance in the nniverse, constituting roughly 75% of the universe's elemental mass. Such hydrogen is a resource capable of being produced just by electrolysis of water, so that it does not emit any pollutants, thereby making it environmentally friendly.

Further, hydrogen advantageously has high energy efficiency, and when compared with rival energy resources such as gasoline, diesel, propane, methane, ethanol, and so on, hydrogen has the highest energy efficiency per unit weight among the energy resources.

As a result of hydrogen high energy's efficiency, recently, hydrogen is produced from a material (such as, petroleum, coal, natural gas, LPG, biogas, or atomic energy) of a given production place, and next, a gas or liquid state of hydrogen is transported to given places for use in stations, buildings, power plants, general households, and so on.

In this case, the gaseous state of hydrogen has an energy density per weight (4.8 MJ/kg) lower than the liquid state of hydrogen (having an energy density per weight (22 MJ/kg) and an energy density per volume (2.5 MJ/f.) lower than the liquid state of hydrogen (having an energy density per volume (7.8 MJ/f.), and when the gaseous state of hydrogen is transported, accordingly, there is a limitation in activating the hydrogen energy.

On the other hand, an existing hydrogen refueling system is provided with a compressor for compressing the gaseous state of hydrogen (hereinafter, referred to as 'gaseous hydrogen') to a high pressure before the gaseous hydrogen is supplied to a given place for the use and a cooler for cooling the gaseous hydrogen to a temperature of −40° C. because the gaseous hydrogen is increased in temperature through expansion at room temperature, while being supplied to a fuel tank of the given place.

The compressor and the cooler consume large amounts of power, and have rather complicated configurations together with surrounding structures.

Further, gaseous hydrogen is transported to the form of a liquid state of hydrogen (hereinafter, referred to as 'liquid hydrogen'), and if gaseous hydrogen is used in a given place, there is a need for a vaporizer for converting liquid hydrogen into gaseous hydrogen and a compressor for compressing gaseous hydrogen to a high pressure before the supply of liquid hydrogen to the given place.

In using liquid hydrogen, however, the compressor is connected to the vaporizer to expand and then compress the liquid hydrogen, so that it may be easily corroded, have a short life span due to severe pressure variations, and be not stable due to high pressure formation, thereby having disadvantages in using the liquid hydrogen.

A conventional refueling system of gaseous hydrogen is disclosed in Korean Patent Application Laid-open No.10-2017-0066587 entitled "Hydrogen station". Further, a conventional refueling system of the liquid hydrogen is disclosed in Korean Patent Application Laid-open No.10-2019-0031386 entitled "Hydrogen refueling device".

The above information disclosed in this Background section is only for understanding of the background of the inventive concepts, and, therefore, it may contain information that does not constitute prior art.

SUMMARY

Exemplary embodiments of the present invention provide a mobile liquid and gaseous hydrogen refueling apparatus that is capable of providing both gaseous hydrogen and liquid hydrogen for places (a device consuming or storing the gaseous hydrogen as a fuel and a device consuming or storing the liquid hydrogen as a fuel) using them.

Exemplary embodiments of the present invention also provide a mobile liquid and gaseous hydrogen refueling apparatus that is capable of raising a pressure of liquid hydrogen in a main storage tank, without using any compressor or any consumption of power caused by the increment of the pressure, to provide the liquid hydrogen to a hydrogen fuel consumption structure (e.g., a hydrogen fuel flying transporting means, a hydrogen fuel land and sea transporting means, or a hydrogen fuel industry power plant household facility).

Additional features of the inventive concepts will be set forth in the description which follows, and in part will be apparent from the description, or may be learned by practice of the inventive concepts.

An exemplary embodiment of the present invention provides a mobile liquid and gaseous hydrogen refueling apparatus including: a main storage module for receiving liquid hydrogen to produce first gaseous hydrogen from the liquid hydrogen; a liquid pumping and transporting module for receiving the liquid hydrogen from the main storage module, pumping the liquid hydrogen, producing second gaseous hydrogen from the liquid hydrogen, and transporting the second gaseous hydrogen to the main storage module; a gas compressing and storing module for receiving at least one of the first gaseous hydrogen and the second gaseous hydrogen from the main storage module, compressing the at least one gaseous hydrogen, and storing the compressed gaseous hydrogen; and a gas converting and transporting module for receiving the pumped liquid hydrogen from the liquid pumping and transporting module and the compressed gaseous hydrogen from the gas compressing and storing module, performing heat exchange between the pumped liquid hydrogen and the compressed gaseous hydrogen, producing gaseous hydrogen for refueling from the pumped liquid hydrogen and the compressed gaseous hydrogen, and transporting the gaseous hydrogen for refueling to a gaseous hydrogen fuel consumption structure, wherein the main storage module pressurizes the liquid hydrogen on the basis of a pressure of the at least one gaseous hydrogen and supplies the pressurized liquid hydrogen to a liquid hydrogen fuel consumption structure.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION OF THE EMBODIMENTS

Figure 1:
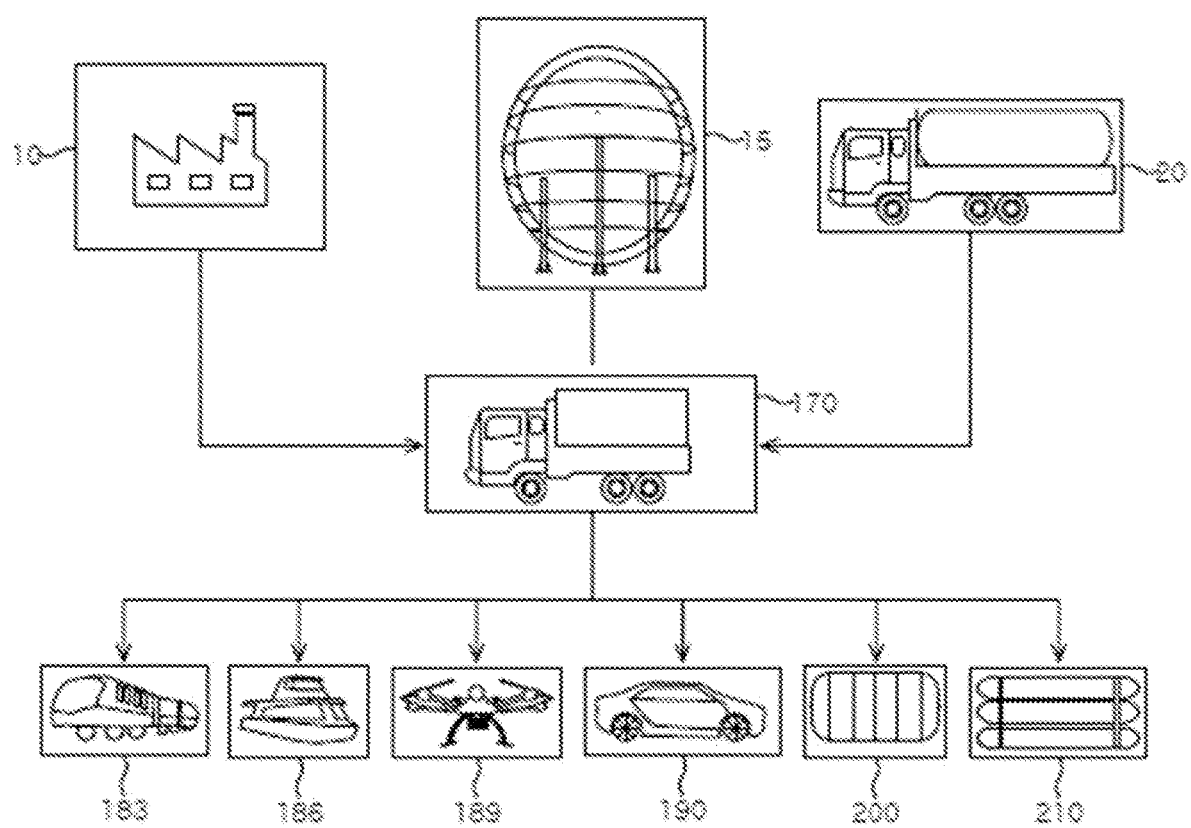
FIG. 1 is a schematic diagram showing a hydrogen industry supply chain according to an exemplary embodiment of the present invention.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or layer or intervening elements may be present. When, however, an element is referred to as being "directly on," "directly connected to," or "directly coupled to" another element, there are no intervening elements present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

So as to allow the present invention to be easily carried out by those having ordinary skill in the art, hereinafter, the present invention will be in detail explained with reference to the attached drawings.

FIG. 1 is a schematic diagram showing a hydrogen industry supply chain according to the present invention.

As shown in FIG. 1, a hydrogen industry supply chain according to an exemplary embodiment of the present invention includes a hydrogen liquefaction plant 10, a liquid hydrogen storing and distributing tank 15, a tank lorry 20, a mobile liquid and gaseous hydrogen refueling apparatus 170, and a hydrogen fuel consumption structure (not shown). The hydrogen liquefaction plant 10 produces and liquefies hydrogen gas from a production material (such as, petroleum, coal, natural gas, LPG, biogas, or atomic energy) to produce liquid hydrogen.

The liquid hydrogen storing and distributing tank 15 receives the liquid hydrogen from the hydrogen liquefaction plant 10, stores the liquid hydrogen, and distributes the liquid hydrogen to a hydrogen usage market, if necessary. The tank lorry 20 receives the liquid hydrogen from the liquid hydrogen storing and distributing tank 15 and transports the liquid hydrogen to the hydrogen usage market. In addition to the supply connection relations as mentioned above, however, the hydrogen liquefaction plant 10, the liquid hydrogen storing and distributing tank 15, and the tank lorry 20 can individually supply the liquid hydrogen to the mobile liquid and gaseous hydrogen refueling apparatus 170.

The mobile liquid and gaseous hydrogen refueling apparatus 170 selectively supplies liquid hydrogen or gaseous hydrogen to the hydrogen fuel consumption structure. The hydrogen fuel consumption structure indicates a building, facility, or device that receives the hydrogen.

The hydrogen fuel consumption structure includes a liquid hydrogen fuel consumption structure and a gaseous hydrogen fuel consumption structure. In detail, the mobile liquid and gaseous hydrogen refueling apparatus 170 charges the gaseous hydrogen or liquid hydrogen to a hydrogen fuel flying transporting means, a hydrogen fuel land and sea transporting means, or a fuel tank or station of a hydrogen fuel industry power plant household facility, as the hydrogen fuel consumption structure, which uses gas or liquid as a fuel (See an arrow with LH2 in FIG. 2 or 9).

In this case, the hydrogen fuel flying transporting means includes a drone 189, the hydrogen fuel land and sea transporting means includes a train 183, a ship 186, a hydrogen fuel cell car 190, and heavy construction equipment (not shown), and the hydrogen fuel industry power plant household facility includes an electronic device of a general household. In a hydrogen gas station, further, the mobile liquid and gaseous hydrogen refueling apparatus 170 can charge the liquid hydrogen to liquid hydrogen storing and filling tanks 200 (See an arrow with LH2 in FIG. 2 or 8) and also charge the gaseous hydrogen (which is also called "gaseous hydrogen for refueling") to gaseous hydrogen storing and refueling tanks 210 (See an arrow with GH2 in FIG. 2 or 8).

The liquid hydrogen storing and filling tanks 200 and the gaseous hydrogen storing and refueling tanks 210 are located plurally under the ground or on the ground in the hydrogen gas station.

Figure 2:
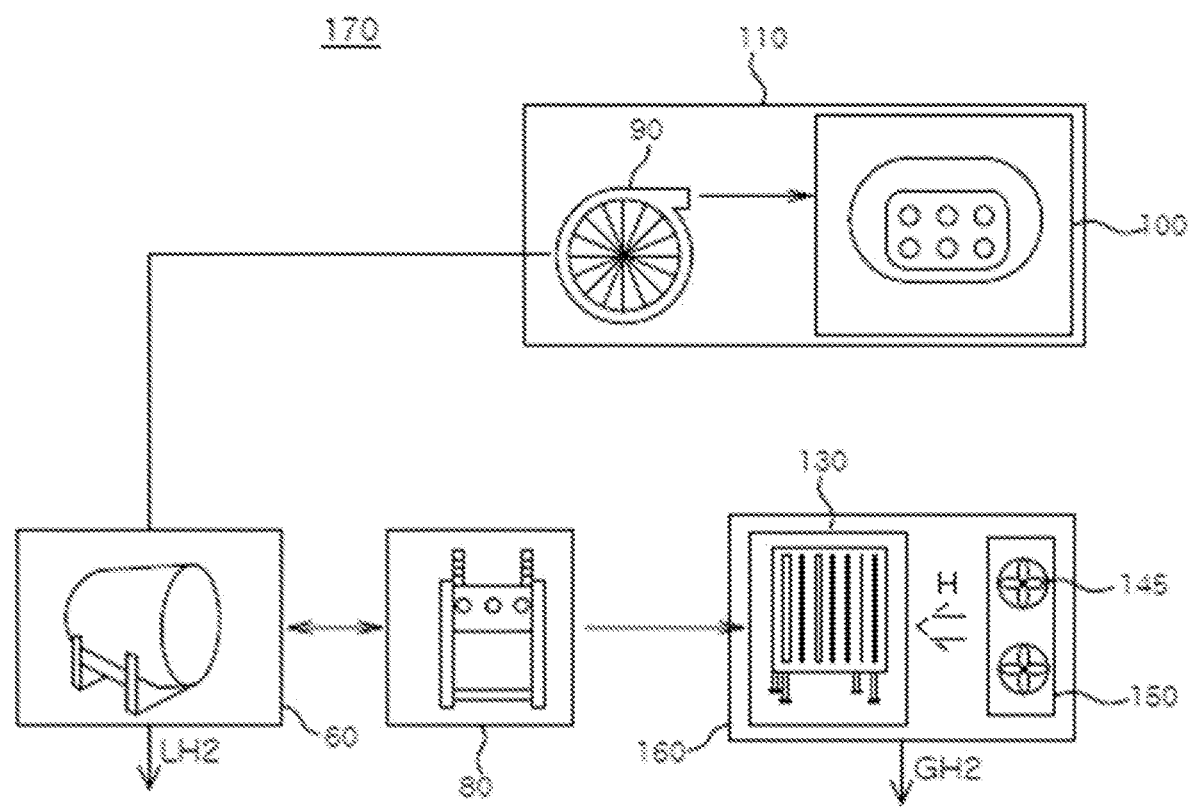
FIG. 2 is a schematic diagram showing components of a mobile liquid and gaseous hydrogen refueling apparatus of FIG. 1.
Figure 3:
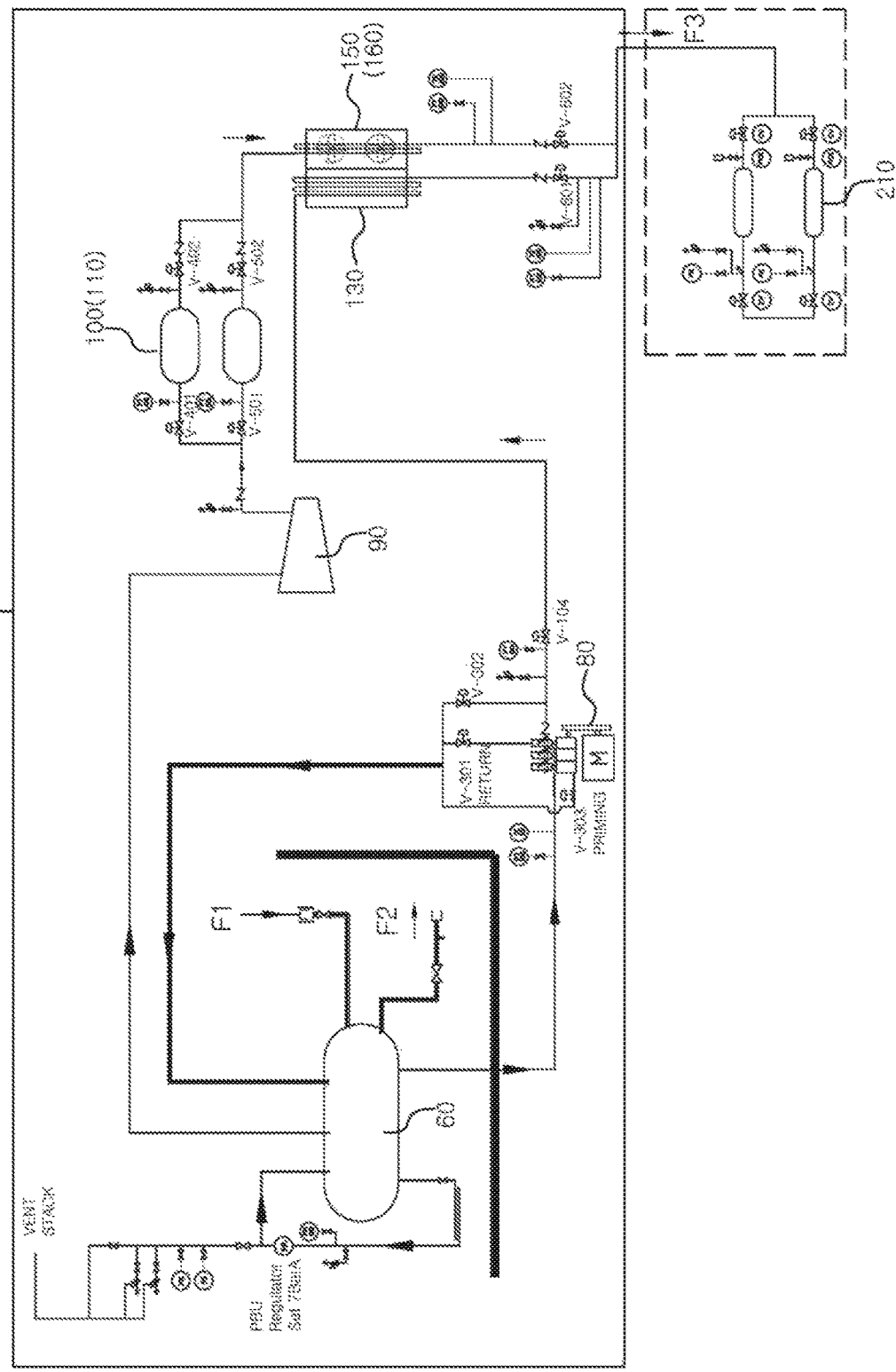
FIG. 3 is a diagram showing connection relations among the components of the mobile liquid and gaseous hydrogen refueling apparatus of FIG. 1.

FIG. 2 is a schematic diagram showing components of a mobile liquid and gaseous hydrogen refueling apparatus of FIG. 1, and FIG. 3 is a diagram showing connection relations among the components of the mobile liquid and gaseous hydrogen refueling apparatus of FIG. 1.

Figure 4:
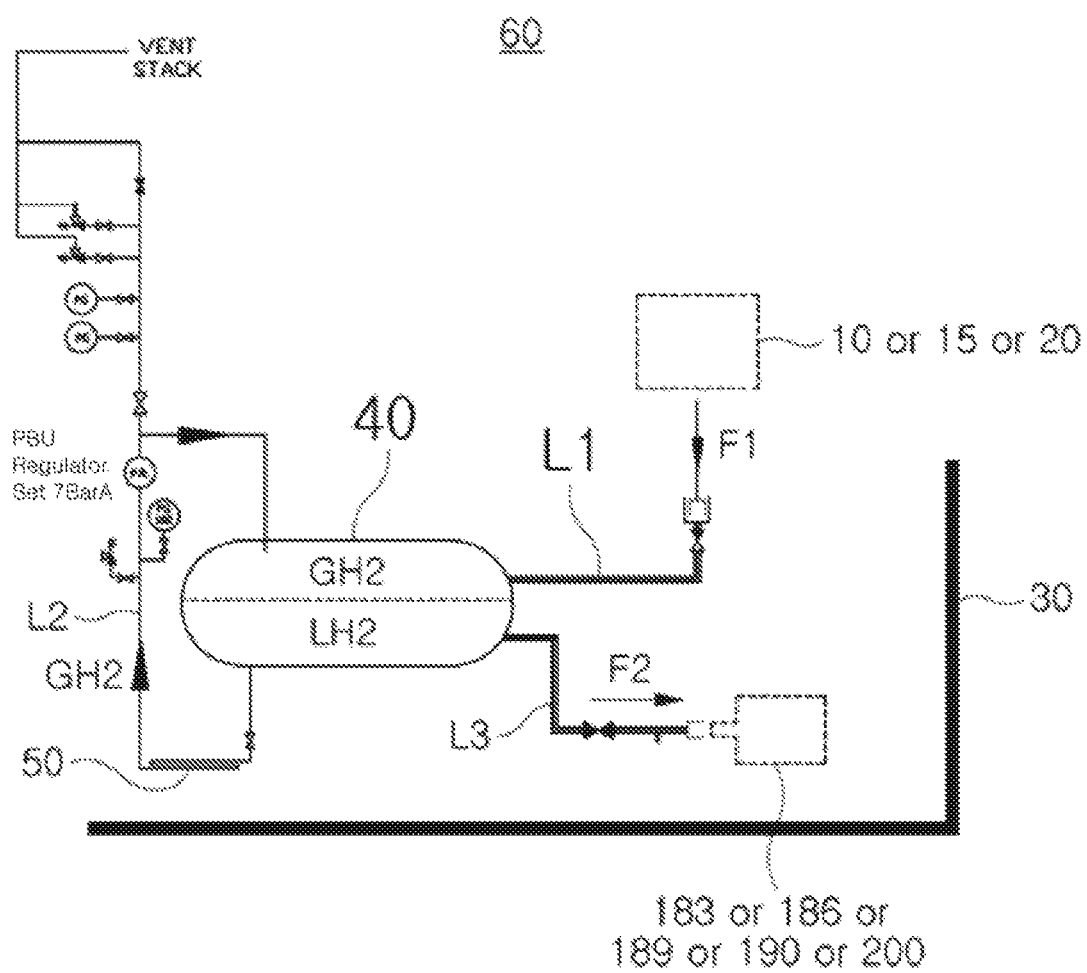
FIG. 4 is a diagram showing a main storage module of FIG. 3.
Figure 5:
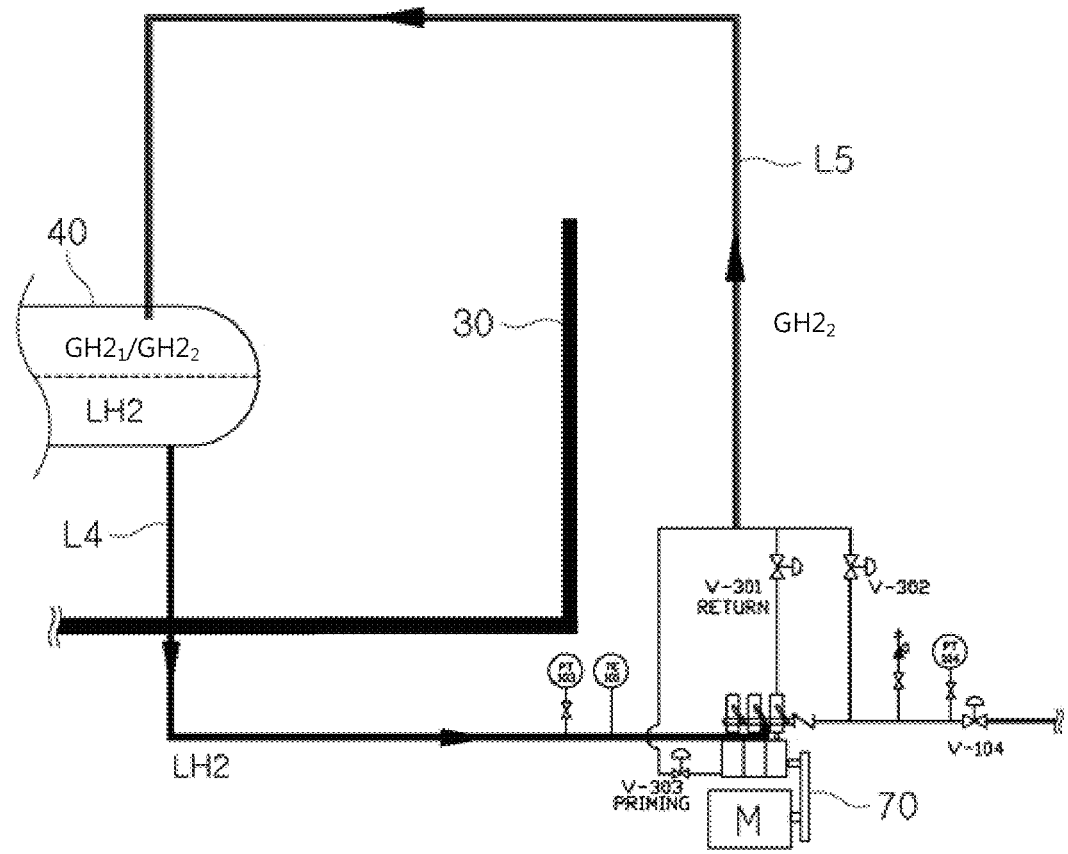
FIG. 5 is a diagram showing a liquid pumping and transporting module of FIG. 3.
Figure 6:
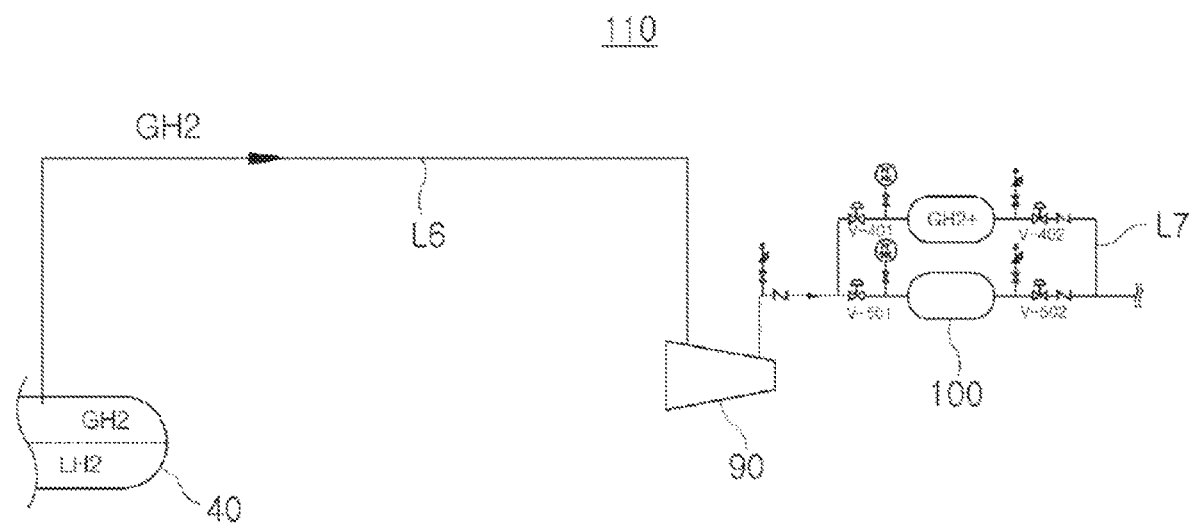
FIG. 6 is a diagram showing a gas compressing and storing module of FIG. 3.

FIG. 4 is a diagram showing a main storage module of FIG. 3; FIG. 5 is a diagram showing a liquid pumping and transporting module of FIG. 3; and FIG. 6 is a diagram showing a gas compressing and storing module of FIG. 3.

Figure 7:
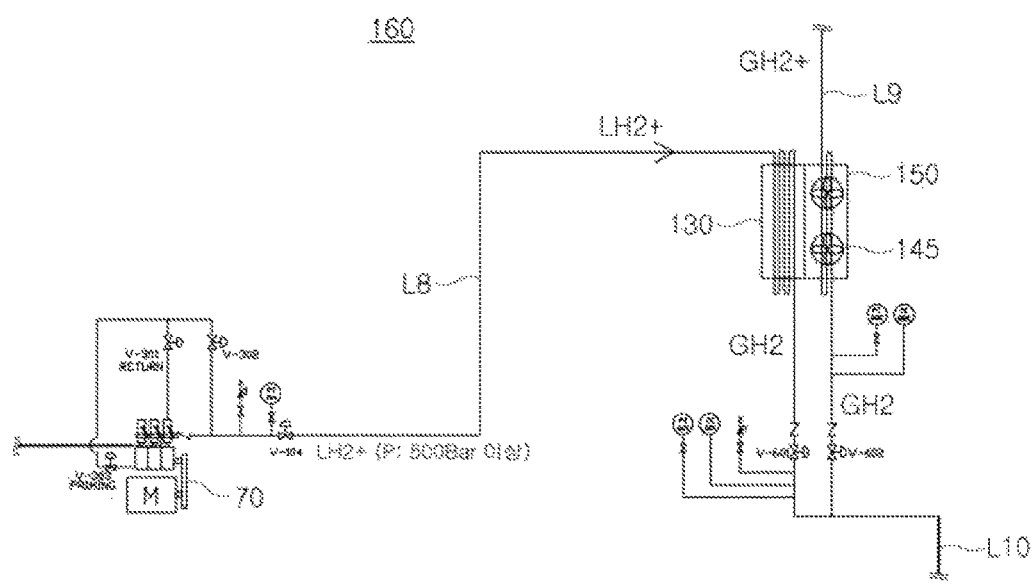
FIG. 7 is a diagram showing a gas converting and transporting module of FIG. 3.

FIG. 7 is a diagram showing a gas converting and transporting module of FIG. 3.

Referring to FIGS. 2 to 7, the mobile liquid and gaseous hydrogen refueling apparatus 170 according to an exemplary embodiment of the present invention includes a main storage module 60, a liquid pumping and transporting module 80, a gas compressing and storing module 110, and a gas converting and transporting module 160. In this case, as shown in FIGS. 1 and 4, the main storage module 60 receives the liquid hydrogen LH2 (See FIG. 4) from the hydrogen liquefaction plant 10, the liquid hydrogen storing and distributing tank 15, or the tank lorry 20 to produce first gaseous hydrogen $GH2_1$ (See FIG. 4).

The liquid pumping and transporting module 80 receives the liquid hydrogen LH2 from the main storage module 60, pumps the liquid hydrogen LH2, produces second gaseous hydrogen $GH2_2$ (See FIG. 5) from the liquid hydrogen LH2, and transports the second gaseous hydrogen $GH2_2$ to the main storage module 60.

The gas compressing and storing module 110 receives at least one of the first gaseous hydrogen $GH2_1$ and the second gaseous hydrogen $GH2_2$ (hereafter $GH2_1/GH2_2$) from the main storage tank 40 in the main storage module 60, compresses the at least one gaseous hydrogen $GH2_1/GH2_2$, and stores the compressed gaseous hydrogen GH2+, as shown in FIG. 6.

The gas converting and transporting module 160 receives the pumped liquid hydrogen LH2+ (See FIG. 7) from the liquid pumping and transporting module 80 and the compressed gaseous hydrogen GH2+ (See FIG. 7) from the gas compressing and storing module 110, performs heat exchange between the pumped liquid hydrogen LH2+ and the compressed gaseous hydrogen GH2+ as shown in FIGS.

2 and 7, produces gaseous hydrogen for refueling GH2 (See FIG. 7), and charges the gaseous hydrogen for refueling GH2 to the gaseous hydrogen storing and refueling tanks 210 of a hydrogen gas station (not shown) with a pressure greater than 500 Bar.

Even before or after the main storage module 60 is connected to the hydrogen gas station through the gas converting and transporting module 160, in this case, it pressurizes the liquid hydrogen on the basis of a pressure of at least one gaseous hydrogen and directly charges the liquid hydrogen to the liquid hydrogen fuel consumption structure (for example, the hydrogen fuel flying transporting means, the hydrogen fuel land and sea transporting means, the hydrogen fuel industry power plant household facility, or the liquid hydrogen storing and filling tanks 200 of the hydrogen gas station).

Referring first to FIGS. 3 and 4, in more detail, the main storage module 60 includes a main storage tank 40, which are surrounded with a protection wall 30, a first pipe line L1, a second pipe line L2, and a third pipe line L3. The main storage tank 40 individually communicates with the first pipe line L1, the second pipe line L2, and the third pipe line L3.

The first pipe line L1 and the third pipe line L3 are formed of double insulating vacuum pipes for preventing heat exchange between the liquid hydrogen LH2 and atmospheric air. The second pipe line L2 is formed of a single pipe for permitting the heat exchange between the liquid hydrogen LH2 and atmospheric air. In this case, the liquid hydrogen LH2 has an absolute temperature of 20 K (−253° C.) and a pressure of 5 Bar.

The first pipe line L1 is fixed to the main storage tank 40, receives the liquid hydrogen LH2 from the hydrogen liquefaction plant 10, the liquid hydrogen storing and distributing tank 15, or the tank lorry 20 along a flow line F1, and charges the liquid hydrogen LH2 to the main storage tank 40. The second pipe line L2 is attached to the top and underside of the main storage tank 40, surrounds the main storage tank 40 at one side of the main storage tank 40, and provides a zigzag-shaped pressure build-up unit 50 under the main storage tank 40.

Further, the second pipe line L2 converts the liquid hydrogen LH2 into first gaseous hydrogen $GH2_1$ through heat exchange between the liquid hydrogen LH2 and atmospheric air in the pressure build-up unit 50 during the flow of the liquid hydrogen LH2 from the underside of the main storage tank 40, and thus, transports the first gaseous hydrogen $GH2_1$ to the top of the main storage tank 40. In this case, the second pipe line L2 has a vent stack for discharging the first gaseous hydrogen $GH2_1$ to the outside at a set pressure or more through a plurality of safety valves.

The third pipe line L3 is attached to the main storage tank 40 and charges the liquid hydrogen LH2 to the liquid hydrogen fuel consumption structure (the train 183, the ship 186, the drone 189, the hydrogen fuel cell car 190, or the liquid hydrogen storing and refueling tanks 200 of the hydrogen gas station) along a flow line F2 during the pressurization of the liquid hydrogen LH2 in at least one gaseous hydrogen $GH2_1/GH2_2$ of the main storage tank 40. The liquid hydrogen fuel consumption structure includes a hydrogen fuel flying transporting means, a hydrogen fuel land and sea transporting means, a hydrogen fuel industry power plant household facility, or a storing and refueling tank of a hydrogen station, which is driven with the liquid hydrogen LH2 supplied to a fuel tank thereof.

Referring to FIGS. 3 and 5, in more detail, the liquid pumping and transporting module 80 includes a high pressure liquid pump 70, a fourth pipe line L4, and a fifth pipe line L5. The high pressure liquid pump 70 is connected individually to the fourth pipe line L4 and the fifth pipe line L5 in such a manner as to communicate with the main storage tank 40 of the main storage module 60 through the fourth pipe line L4 and the fifth pipe line L5. The fourth pipe line L4 is formed of a double insulating vacuum pipe for preventing heat exchange between the liquid hydrogen LH2 and atmospheric air.

The fifth pipe line L5 is formed of a double insulating vacuum pipe for preventing heat exchange between the second gaseous hydrogen $GH2_2$ and atmospheric air. In this case, the liquid hydrogen LH2 has an absolute temperature of 20 K (−253° C.) and a pressure of 5 Bar. The fourth pipe line L4 fixedly communicates with one side of the main storage tank 40 of the main storage module 60, connects the main storage tank 40 to the high pressure liquid pump 70, receives the liquid hydrogen LH2 from one side of the main storage tank 40, and charges the liquid hydrogen LH2 to the high pressure liquid pump 70.

The high pressure liquid pump 70 receives the liquid hydrogen LH2 from the main storage tank 40 of the main storage module 60 through the fourth pipe line L4, pumps the liquid hydrogen LH2, produces the pumped liquid hydrogen LH2+ as shown in FIG. 7 and the second gaseous hydrogen $GH2_2$, and transports the pumped liquid hydrogen LH2+ to the gas converting and transporting module 160 and the second gaseous hydrogen $GH2_2$ to the fifth pipe line L5. In this case, the pumped liquid hydrogen LH2+ has a pressure greater than 500 bar.

The fifth pipe line L5 fixedly communicates with the other side of the main storage tank 40 of the main storage module 60, connects the main storage tank 40 to the high pressure liquid pump 70, receives the second gaseous hydrogen $GH2_2$ from the high pressure liquid pump 70, and charges the second gaseous hydrogen $GH2_2$ to the main storage tank 40.

Referring to FIGS. 3 and 6, in more detail, the gas compressing and storing module 110 includes a compressor 90, buffer storage tanks 100, a sixth pipe line L6, and a seventh pipe line L7. The compressor 90 and the buffer storage tanks 100 are connected to each other through the sixth pipe line L6 and the seventh pipe line L7 in such a manner as to to communicate with the main storage tank 40 of the main storage module 60. The sixth pipe line L6 and the seventh pipe line L7 are formed of single pipes.

The sixth pipe line L6 is located between the main storage tank 40 and the compressor 90 in such a manner as to fixedly communicate with the main storage tank 40, receives the at least one gaseous hydrogen $GH2_1/GH2_2$ from the main storage tank 40, and charges the at least one gaseous hydrogen $GH2_1/GH2_2$ to the compressor 90. This is because the first gaseous hydrogen $GH2_1$ and the second gaseous hydrogen $GH2_2$ are produced simultaneously or individually as necessary in the mobile liquid and gaseous hydrogen refueling apparatus 170.

The compressor 90 receives the at least one gaseous hydrogen $GH2_1/GH2_2$ from the sixth pipe line L6, compresses the at least one gaseous hydrogen $GH2_1/GH2_2$, produces the compressed gaseous hydrogen GH2+, and supplies the compressed gaseous hydrogen GH2+ to the seventh pipe line L7. The compressed gaseous hydrogen GH2+ has density, pressure, and heat greater than the at least one gaseous hydrogen $GH2_1/GH2_2$.

The seventh pipe line L7 connects the compressor 90 to the buffer storage tanks 100, connects the buffer storage tanks 100 in parallel with each other thereon, receives the compressed gaseous hydrogen GH2+ from the compressor 90, and charges the compressed gaseous hydrogen GH2+ to the buffer storage tanks 100. In this case, the compressed gaseous hydrogen GH2+ has a pressure greater than 500 bar.

Referring to FIGS. 3 and 7, in more detail, the gas converting and transporting module 160 includes an absorber 130, a radiator 150, an eighth pipe line L8, a ninth pipe line L9, and a tenth pipe line L10. The eighth pipe line L8, the ninth pipe line L9, and the tenth pipe line L10 are formed of single pipes.

As shown in FIG. 7, the eighth pipe line L8 is connected to the high pressure liquid pump 70 of the liquid pumping and transporting module 80, passes through the absorber 130, and is extended toward the tenth pipe line L10. As shown in FIGS. 3 and 7, the ninth pipe line L9 is connected to the buffer storage tanks 100 of the gas compressing and storing module 110, passes through the radiator 150, and is extended toward the tenth pipe line L10. The tenth pipe line L10 is connected to the eighth pipe line L8 and the ninth pipe line L9 around the absorber 130 and the radiator 150.

In this case, the eighth pipe line L8 receives the pumped liquid hydrogen LH2+ from the high pressure liquid pump 70 of the liquid pumping and transporting module 80, charges the pumped liquid hydrogen LH2+ to the absorber 130, converts the pumped liquid hydrogen LH2+ into the gaseous hydrogen for refueling GH2 by means of heat received from the absorber 130, and transports the gaseous hydrogen for refueling GH2 to the tenth pipe line L10.

The absorber 130 surrounds the eighth pipe line L8, communicates with the radiator 150, receives heat from the radiator 150 and atmospheric air, and transports the heat to the eighth pipe line L8. The ninth pipe line L9 receives the compressed gaseous hydrogen GH2+ from the buffer storage tanks 100 of the gas compressing and storing module 110, charges the compressed gaseous hydrogen GH2+ to the radiator 150, transports heat of the compressed gaseous hydrogen GH2+ to the radiator 150, converts the compressed gaseous hydrogen GH2+ into the gaseous hydrogen for refueling GH2, and transports the gaseous hydrogen for refueling GH2 to the tenth pipe line L10.

The radiator 150 surrounds the ninth pipe line L9, communicates with the absorber 130, and transports the heat H (See FIG. 2) of the compressed gaseous hydrogen GH2+ on the ninth pipe line L9 to the absorber 130 during fans 145 of the radiator 150 rotate.

The tenth pipe line L10 receives the compressed liquid hydrogen LH2+ from the eighth pipe line L8 or the compressed gaseous hydrogen GH2+ from the ninth pipe line L9 and charges the gaseous hydrogen for refueling GH2 to the gaseous hydrogen storing and refueling tanks 210 of the hydrogen gas station along a flow line F3 (See FIG. 3). The liquid hydrogen storing and filling tanks 200 or the gaseous hydrogen storing and refueling tanks 210 are located plurally under the ground or on the ground in the hydrogen gas station. The gaseous hydrogen for refueling GH2 has a pressure greater than 500 bar.

Figure 8:
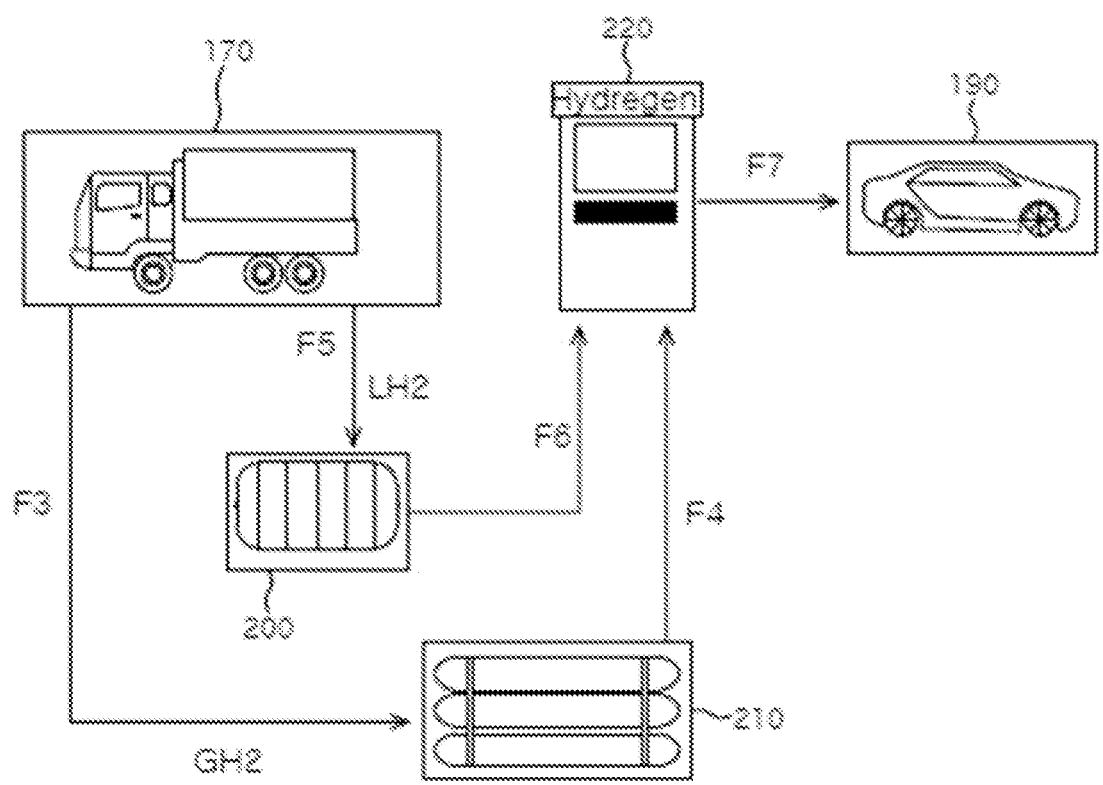
FIGS. 8 and 9 are schematic diagrams showing methods for using the mobile liquid and gaseous hydrogen refueling apparatus of FIG. 1.
Figure 9:
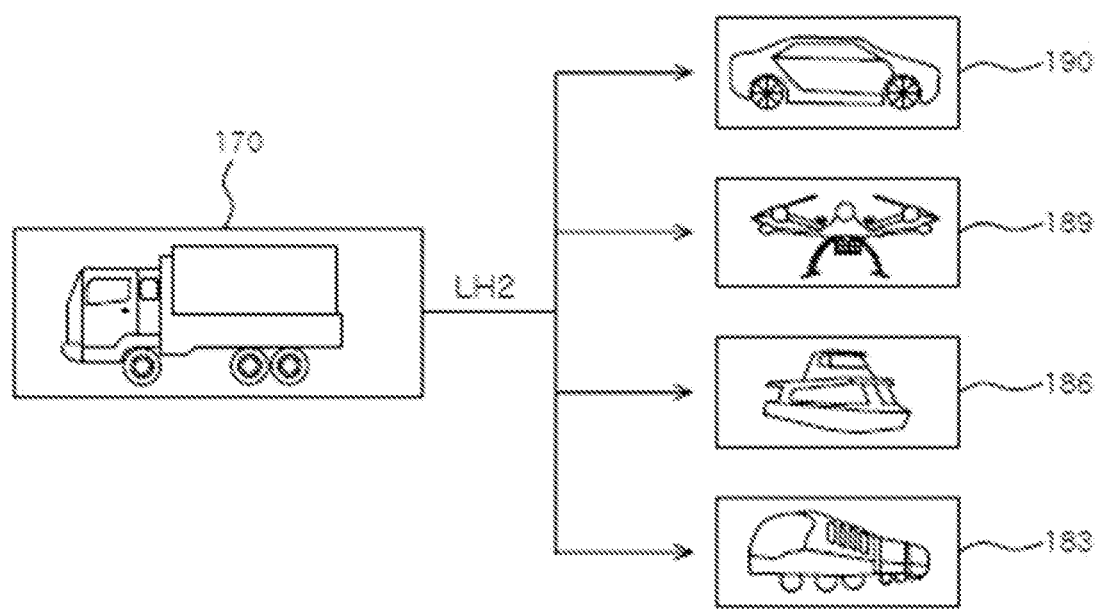

FIGS. 8 and 9 are schematic diagrams showing methods for using the mobile liquid and gaseous hydrogen refueling apparatus of FIG. 1.

Referring first to FIG. 8, the mobile liquid and gaseous hydrogen refueling apparatus 170 in a hydrogen refueling system according to a first exemplary embodiment of the present invention charges the gaseous hydrogen GH2 to the gaseous hydrogen fuel consumption structure through the tenth pipe line L10 of the gas converting and transporting module 160, as described above with reference to FIGS. 3 and 7. The gaseous hydrogen fuel consumption structure includes a flying transporting means, a land and sea transporting means, a hydrogen fuel industry power plant household facility, or a storing and refueling tank of a hydrogen gas station, which is driven with the gaseous hydrogen for refueling GH2 supplied to a fuel tank thereof.

For example, the gaseous hydrogen storing and refueling tanks 210 receive the gaseous hydrogen for refueling GH2 from the buffer storage tanks 100 of the mobile liquid and gaseous hydrogen refueling apparatus 170, the tenth pipe line L10, and the flow line F3, store the gaseous hydrogen for refueling GH2, and transport the gaseous hydrogen for refueling GH2 to a refueling terminal 220 along a flow line F4 upon the request of a driver of the hydrogen fuel cell car 190. In this case, the refueling terminal 220 charges the gaseous hydrogen for refueling GH2 to a fuel tank of the hydrogen fuel cell car 190 along a flow line F7.

Further, as shown in FIGS. 3 and 4, the mobile liquid and gaseous hydrogen refueling apparatus 170 is connected to the liquid hydrogen storing and filling tanks 200 through the third pipe line L3 of the main storage module 60. The liquid hydrogen storing and filling tanks 200 receive the liquid hydrogen LH2 from the main storage tank 40 of the mobile liquid and gaseous hydrogen refueling apparatus 170, the third pipe line L3, and the flow line F5, store the liquid hydrogen LH2, and transport the liquid hydrogen LH2 to the refueling terminal 220 along a flow line F6 upon the request of the driver of the hydrogen fuel cell car 190.

In this case, the refueling terminal 220 charges the liquid hydrogen LH2 to a fuel pack of the hydrogen fuel cell car 190 along the flow line F7.

Referring next to FIG. 9, the mobile liquid and gaseous hydrogen refueling apparatus 170 in a hydrogen refueling system according to a second exemplary embodiment of the present invention directly charges the liquid hydrogen LH2 to a fuel tank or pack of the hydrogen fuel flying transporting means like the drone 189 or to a fuel tank or pack of the hydrogen fuel land and sea transporting means like the train 183, the ship 186, or the hydrogen fuel cell car 190, as described above with reference to FIG. 3 or FIG. 7.

In this case, the liquid hydrogen LH2 is charged to the fuel tank or pack of the train 183, the ship 186, the drone 189, or the hydrogen fuel cell car 190, through the third pipe line L3 of the main storage tank 40 of the mobile liquid and gaseous hydrogen refueling apparatus 170. Further, the mobile liquid and gaseous hydrogen refueling apparatus 170 directly charges the liquid hydrogen LH2 to a fuel tank or pack of the hydrogen fuel industry power plant household facility like the electronic device of a general household.

As described above, the mobile liquid and gaseous hydrogen refueling apparatus according to the inventive concepts can supply the gaseous hydrogen and the liquid hydrogen to all of places using them.

In addition, the mobile liquid and gaseous hydrogen refueling apparatus according to the inventive concepts includes the main storage tank, the high pressure liquid pump, and the absorber in such a manner as to allow a pressure of the liquid hydrogen of the main storage tank to be increased by means of the high pressure liquid pump to thus transport the pumped liquid hydrogen to the absorber, so that through the use of the high pressure liquid pump, power consumption in the present invention is reduced to $\frac{1}{10}$ of power consumption in the conventional practice where a compressor is used as well known to those having ordinary skill in the art, thereby improving hydrogen refueling performance.

Further, the mobile liquid and gaseous hydrogen refueling apparatus according to the inventive concepts is provided with the main storage tank and the pipe lines partially surrounding the main storage tank, so that during the liquid hydrogen flows along the pipe lines from the main storage tank, heat of atmospheric air is absorbed to the pipe lines to allow the liquid hydrogen to be converted into the gaseous hydrogen, to allow the gaseous hydrogen to be transported to the main storage tank, to allow the liquid hydrogen in the main storage tank to be pressurized against the pressure of the gaseous hydrogen, and to allow the liquid hydrogen to be directly charged to the fuel tank or pack of the hydrogen fuel consumption structure (e.g., the hydrogen fuel flying transporting means, the hydrogen fuel land and sea transporting means, or the hydrogen fuel industry power plant household facility).

Furthermore, the mobile liquid and gaseous hydrogen refueling apparatus according to the inventive concepts includes the main storage tank, the high pressure liquid pump, the compressor, the buffer storage tanks, the absorber, and the radiator in such a manner as to allow at least one of the first gaseous hydrogen converted partially from the liquid hydrogen of the main storage tank and the second gaseous hydrogen produced as a by-product during the liquid hydrogen is pumped by means of the high pressure liquid pump to be compressed by means of the compressor, to allow the compressed gaseous hydrogen to be stored in the buffer storage tanks, to allow heat exchange between the compressed gaseous hydrogen and the pumped liquid hydrogen to be performed in the absorber and the radiator, and to allow both of the compressed gaseous hydrogen and the pumped liquid hydrogen to be converted into the gaseous hydrogen for refueling.

According to the inventive concepts, desirably, the mobile liquid and gaseous hydrogen refueling apparatus is mounted on a movable vehicle (for example, a truck or the like) to provide the gaseous hydrogen and liquid hydrogen for both of a device consuming or storing the gaseous hydrogen and a device consuming or storing the liquid hydrogen.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A mobile liquid and gaseous hydrogen refueling apparatus comprising:
   a main storage module configured to receive liquid hydrogen to produce first gaseous hydrogen from the liquid hydrogen by heat exchange between the liquid hydrogen and atmospheric air;
   a liquid pumping and transporting module configured to receive the liquid hydrogen from the main storage module, pump the liquid hydrogen, produce second gaseous hydrogen from the liquid hydrogen, and transport the second gaseous hydrogen to the main storage module;
   a gas compressing and storing module configured to receive at least one of the first gaseous hydrogen and the second gaseous hydrogen from the main storage module, compress the at least one gaseous hydrogen, and store the compressed gaseous hydrogen; and
   a gas converting and transporting module configured to receive the pumped liquid hydrogen from the liquid pumping and transporting module and the compressed gaseous hydrogen from the gas compressing and storing module, perform heat exchange between the pumped liquid hydrogen and the compressed gaseous hydrogen, produce gaseous hydrogen for refueling from the pumped liquid hydrogen and the compressed gaseous hydrogen, and transport the gaseous hydrogen for refueling to a gaseous hydrogen fuel consumption structure,
   wherein the main storage module pressurizes the liquid hydrogen on the basis of a pressure of the first gaseous hydrogen and the second gaseous hydrogen, and supplies the pressurized liquid hydrogen to a liquid hydrogen fuel consumption structure.

2. The apparatus according to claim 1, wherein the main storage module comprises:
   a main storage tank;
   a first pipe line;
   a second pipe line, and
   a third pipe line,
   wherein the main storage tank, the first pipe line, the second pipe line, and the third pipe line are surrounded with a protection wall, the main storage tank individually communicating with the first pipe line, the second pipe line, and the third pipe line, the first pipe line and the third pipe line being formed of double insulating vacuum pipes for preventing heat exchange between the liquid hydrogen and atmospheric air, and the second pipe line being formed of a single pipe for permitting the heat exchange between the liquid hydrogen and atmospheric air.

3. The apparatus according to claim 2, wherein the second pipe line is fixed to a top and an underside of the main storage tank, surrounds the main storage tank at one side of the main storage tank, and provides a zigzag-shaped pressure build-up unit under the main storage tank, so that the second pipe line converts the liquid hydrogen into the first gaseous hydrogen through the heat exchange between the liquid hydrogen and atmospheric air in the pressure build-up unit during the flow of the liquid hydrogen from the underside of the main storage tank and transports the first gaseous hydrogen to top of the main storage tank.

4. The apparatus according to claim 2, wherein the third pipe line is fixed to the main storage tank and charges the liquid hydrogen pressurized against the at least gaseous hydrogen in the main storage tank to the liquid hydrogen fuel consumption structure.

5. The apparatus according to claim 1, wherein the liquid pumping and transporting module comprises:
   a high pressure liquid pump;
   a fourth pipe line; and
   a fifth pipe line;
   wherein the high pressure liquid pump is connected individually to the fourth pipe line and the fifth pipe line in such a manner as to communicate with the main storage tank of the main storage module through the fourth pipe line and the fifth pipe line, the fourth pipe line being formed of a double insulating vacuum pipe for preventing the heat exchange between the liquid hydrogen and atmospheric air, and the fifth pipe line being formed of a double insulating vacuum pipe for preventing heat exchange between the second gaseous hydrogen and atmospheric air.

6. The apparatus according to claim 5, wherein the fourth pipe line fixedly communicates with one side of the main storage tank of the main storage module, connects the main storage tank to the high pressure liquid pump, receives the liquid hydrogen from one side of the main storage tank, and charges the liquid hydrogen to the high pressure liquid pump.

7. A mobile liquid and gaseous hydrogen refueling apparatus comprising:
   a main storage module configured to receive liquid hydrogen to produce first gaseous hydrogen from the liquid hydrogen;
   a liquid pumping and transporting module configured to receive the liquid hydrogen from the main storage module, pump the liquid hydrogen, produce second gaseous hydrogen from the liquid hydrogen, and transport the second gaseous hydrogen to the main storage module;
   a gas compressing and storing module configured to receive at least one of the first gaseous hydrogen and the second gaseous hydrogen from the main storage module, compress the at least one gaseous hydrogen, and store the compressed gaseous hydrogen; and
   a gas converting and transporting module configured to receive the pumped liquid hydrogen from the liquid pumping and transporting module and the compressed gaseous hydrogen from the gas compressing and storing module, perform heat exchange between the pumped liquid hydrogen and the compressed gaseous hydrogen, produce gaseous hydrogen for refueling from the pumped liquid hydrogen and the compressed gaseous hydrogen, and transport the gaseous hydrogen for refueling to a gaseous hydrogen fuel consumption structure,
   wherein:
   the main storage module pressurizes the liquid hydrogen on the basis of a pressure of the at least one gaseous hydrogen and supplies the pressurized liquid hydrogen to a liquid hydrogen fuel consumption structure;
   the liquid pumping and transporting module comprises:
      a high pressure liquid pump;
      a fourth pipe line; and
      a fifth pipe line;
   the high pressure liquid pump is connected individually to the fourth pipe line and the fifth pipe line in such a manner as to communicate with the main storage tank of the main storage module through the fourth pipe line and the fifth pipe line, the fourth pipe line being formed of a double insulating vacuum pipe for preventing the heat exchange between the liquid hydrogen and atmospheric air, and the fifth pipe line being formed of a double insulating vacuum pipe for preventing heat exchange between the second gaseous hydrogen and atmospheric air; and
   the high pressure liquid pump receives the liquid hydrogen from the main storage tank of the main storage module through the fourth pipe line, pumps the liquid hydrogen, produces the pumped liquid hydrogen and the second gaseous hydrogen, and transports the pumped liquid hydrogen to the gas converting and transporting module and the second gaseous hydrogen to the fifth pipe line.

8. A mobile liquid and gaseous hydrogen refueling apparatus comprising:
   a main storage module configured to receive liquid hydrogen to produce first gaseous hydrogen from the liquid hydrogen by heat exchange between the liquid hydrogen and atmospheric air;
   a liquid pumping and transporting module configured to receive the liquid hydrogen from the main storage module, pump the liquid hydrogen, produce second gaseous hydrogen from the liquid hydrogen, and transport the second gaseous hydrogen to the main storage module;
   a gas compressing and storing module configured to receive at least one of the first gaseous hydrogen and the second gaseous hydrogen from the main storage module, compress the at least one gaseous hydrogen, and store the compressed gaseous hydrogen; and
   a gas converting and transporting module configured to receive the pumped liquid hydrogen from the liquid pumping and transporting module and the compressed gaseous hydrogen from the gas compressing and storing module, perform heat exchange between the pumped liquid hydrogen and the compressed gaseous hydrogen, produce gaseous hydrogen for refueling from the pumped liquid hydrogen and the compressed gaseous hydrogen, and transport the gaseous hydrogen for refueling to a gaseous hydrogen fuel consumption structure,
   wherein:
   the main storage module pressurizes the liquid hydrogen on the basis of a pressure of the first gaseous hydrogen and the second gaseous hydrogen, and supplies the pressurized liquid hydrogen to a liquid hydrogen fuel consumption structure;
   the liquid pumping and transporting module comprises:
      a high pressure liquid pump;
      a fourth pipe line; and
      a fifth pipe line;
   the high pressure liquid pump is connected individually to the fourth pipe line and the fifth pipe line in such a manner as to communicate with the main storage tank of the main storage module through the fourth pipe line and the fifth pipe line, the fourth pipe line being formed of a double insulating vacuum pipe for preventing the heat exchange between the liquid hydrogen and atmospheric air, and the fifth pipe line being formed of a double insulating vacuum pipe for preventing heat exchange between the second gaseous hydrogen and atmospheric air; and
   the fifth pipe line fixedly communicates with the other side of the main storage tank of the main storage module, connects the main storage tank to the high pressure liquid pump, receives the second gaseous hydrogen from the high pressure liquid pump, and charges the second gaseous hydrogen to the main storage tank.

9. The apparatus according to claim 1, wherein the gas compressing and storing module comprises:
   a compressor;
   a plurality of buffer storage tanks;
   a sixth pipe line; and
   a seventh pipe line,
   wherein the compressor and the buffer storage tanks are connected to each other through the sixth pipe line and the seventh pipe line in such a manner as to communicate with the main storage tank of the main storage module, and the sixth pipe line and the seventh pipe line are formed of single pipes.

10. The apparatus according to claim 9, wherein the sixth pipe line is located between the main storage tank and the compressor in such a manner as to fixedly communicate with the main storage tank, receives the at least one gaseous hydrogen from the main storage tank, and charges the at least one gaseous hydrogen to the compressor.

11. The apparatus according to claim 9, wherein the compressor receives the at least one gaseous hydrogen from the sixth pipe line, compresses the at least one gaseous hydrogen, produces the compressed gaseous hydrogen, and supplies the compressed gaseous hydrogen to the seventh pipe line, the compressed gaseous hydrogen having density, pressure, and heat greater than the at least one gaseous hydrogen.

12. The apparatus according to claim 9, wherein the seventh pipe line connects the compressor to the buffer storage tanks, connects the buffer storage tanks in parallel with each other thereon, receives the compressed gaseous hydrogen from the compressor, and charges the compressed gaseous hydrogen to the buffer storage tanks.

13. A mobile liquid and gaseous hydrogen refueling apparatus comprising:
   a main storage module configured to receive liquid hydrogen to produce first gaseous hydrogen from the liquid hydrogen;
   a liquid pumping and transporting module configured to receive the liquid hydrogen from the main storage module, pump the liquid hydrogen, produce second gaseous hydrogen from the liquid hydrogen, and transport the second gaseous hydrogen to the main storage module;
   a gas compressing and storing module configured to receive at least one of the first gaseous hydrogen and the second gaseous hydrogen from the main storage module, compress the at least one gaseous hydrogen, and store the compressed gaseous hydrogen; and
   a gas converting and transporting module configured to receive the pumped liquid hydrogen from the liquid pumping and transporting module and the compressed gaseous hydrogen from the gas compressing and storing module, perform heat exchange between the pumped liquid hydrogen and the compressed gaseous hydrogen, produce gaseous hydrogen for refueling from the pumped liquid hydrogen and the compressed gaseous hydrogen, and transport the gaseous hydrogen for refueling to a gaseous hydrogen fuel consumption structure, wherein:
   the gas converting and transporting module comprises:
      an absorber;
      a radiator;
      an eighth pipe line;
      a ninth pipe line; and
      a tenth pipe line; and the eighth pipe line, the ninth pipe line, and the tenth pipe line are formed of single pipes, the eighth pipe line is connected to a high pressure liquid pump included in the liquid pumping and transporting module, passes through the absorber, and extends toward the tenth pipe line, the ninth pipe line is connected to buffer storage tanks included in the gas compressing and storing module, passes through the radiator, and extends toward the tenth pipe line, and the tenth pipe line is connected to the eighth pipe line and the ninth pipe line around the absorber and the radiator.

14. The apparatus according to claim 13, wherein the eighth pipe line receives the pumped liquid hydrogen from the high pressure liquid pump of the liquid pumping and transporting module, charges the pumped liquid hydrogen to the absorber, converts the pumped liquid hydrogen into the gaseous hydrogen for refueling with heat received from the absorber, and transports the gaseous hydrogen for refueling to the tenth pipe line.

15. The apparatus according to claim 13, wherein the absorber surrounds the eighth pipe line, communicates with the radiator, receives heat from the radiator and atmospheric air, and transports the heat to the eighth pipe line.

16. The apparatus according to claim 13, wherein the ninth pipe line receives the compressed gaseous hydrogen from the buffer storage tanks of the gas compressing and storing module, charges the compressed gaseous hydrogen to the radiator, transports heat of the compressed gaseous hydrogen to the radiator, converts the compressed gaseous hydrogen into the gaseous hydrogen for refueling, and transports the gaseous hydrogen for refueling to the tenth pipe line.

17. The apparatus according to claim 13, wherein the radiator surrounds the ninth pipe line, communicates with the absorber, and transports the heat of the compressed gaseous hydrogen on the ninth pipe line to the absorber during fans of the radiator rotate.

18. The apparatus according to claim 13, wherein the tenth pipe line receives the gaseous hydrogen for refueling from the eighth pipe line or the ninth pipe line and charges the gaseous hydrogen for refueling to the gaseous hydrogen fuel consumption structure.

19. The apparatus according to claim 1, wherein the apparatus is mounted on a movable vehicle.

* * * * *